(12) United States Patent
Fieldman

(10) Patent No.: US 12,243,123 B1
(45) Date of Patent: Mar. 4, 2025

(54) METHOD OF SURROUNDING OR PARTIALLY SURROUNDING A USER WITH INFORMATION BOARDS IN EXTENDED REALITY ENVIRONMENTS

(71) Applicant: VR-EDU, Inc., Gainesville, FL (US)

(72) Inventor: Ethan Fieldman, Gainesville, FL (US)

(73) Assignee: VR-EDU, Inc., Gainesville, FL (US)

( * ) Notice: Subject to any disclaimer, the term of this patent is extended or adjusted under 35 U.S.C. 154(b) by 0 days.

(21) Appl. No.: 18/459,873

(22) Filed: Sep. 1, 2023

(51) Int. Cl.
*G06T 11/00* (2006.01)
*G06F 3/01* (2006.01)
*G06F 3/14* (2006.01)
*G09B 5/02* (2006.01)

(52) U.S. Cl.
CPC ............. *G06T 11/00* (2013.01); *G06F 3/011* (2013.01); *G06F 3/1454* (2013.01); *G09B 5/02* (2013.01)

(58) Field of Classification Search
CPC ............. G06F 2111/18; G06F 3/0481; G06F 3/04817; G06F 9/4443; G06F 3/04847; G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | | |
|---|---|---|---|
| 11,631,228 B2 | 4/2023 | Fieldman | |
| 2022/0139056 A1* | 5/2022 | Fieldman | G06F 3/0304 |
| | | | 345/419 |
| 2024/0040097 A1* | 2/2024 | Patel | G06F 3/04815 |

OTHER PUBLICATIONS

Dall-E/Dall-E2; retrieved on Sep. 28, 2023; 12 pages; https://openai.com/product/dall-e-2.

* cited by examiner

*Primary Examiner* — Charles Tseng
(74) *Attorney, Agent, or Firm* — Polsinelli PC

(57) ABSTRACT

A method for changing the linear arrangement of a plurality of information boards in an extended reality environment to appear to surround or partially surround a user to make viewing and interaction with the boards easier.

19 Claims, 10 Drawing Sheets

METHOD OF SURROUNDING OR PARTIALLY SURROUNDING A USER WITH INFORMATION BOARDS IN EXTENDED REALITY ENVIRONMENTS

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

U.S. Pat. No. 11,631,228 incorporated herein by reference in its entirety, describes using information boards in XR environments. The present invention provides improved methods for creating and using information boards in various embodiments.

SUMMARY OF THE INVENTION

Embodiments of the invention provide an improved method and system for users in XR environments, including VR environments such as in the Oculus/Meta Quest platform by Oculus VR (Irvine, CA) (parent company Meta), to use information boards in advantageous arrangements not similarly possible and/or practical in real world environments.

It will be appreciated that the systems and methods, including related displays, user interfaces, controls and functionalities, disclosed herein may be similarly implemented on other XR platforms with other XR SDKs and software development tools known to XR developers.

DETAILED DESCRIPTION

Figure 1:
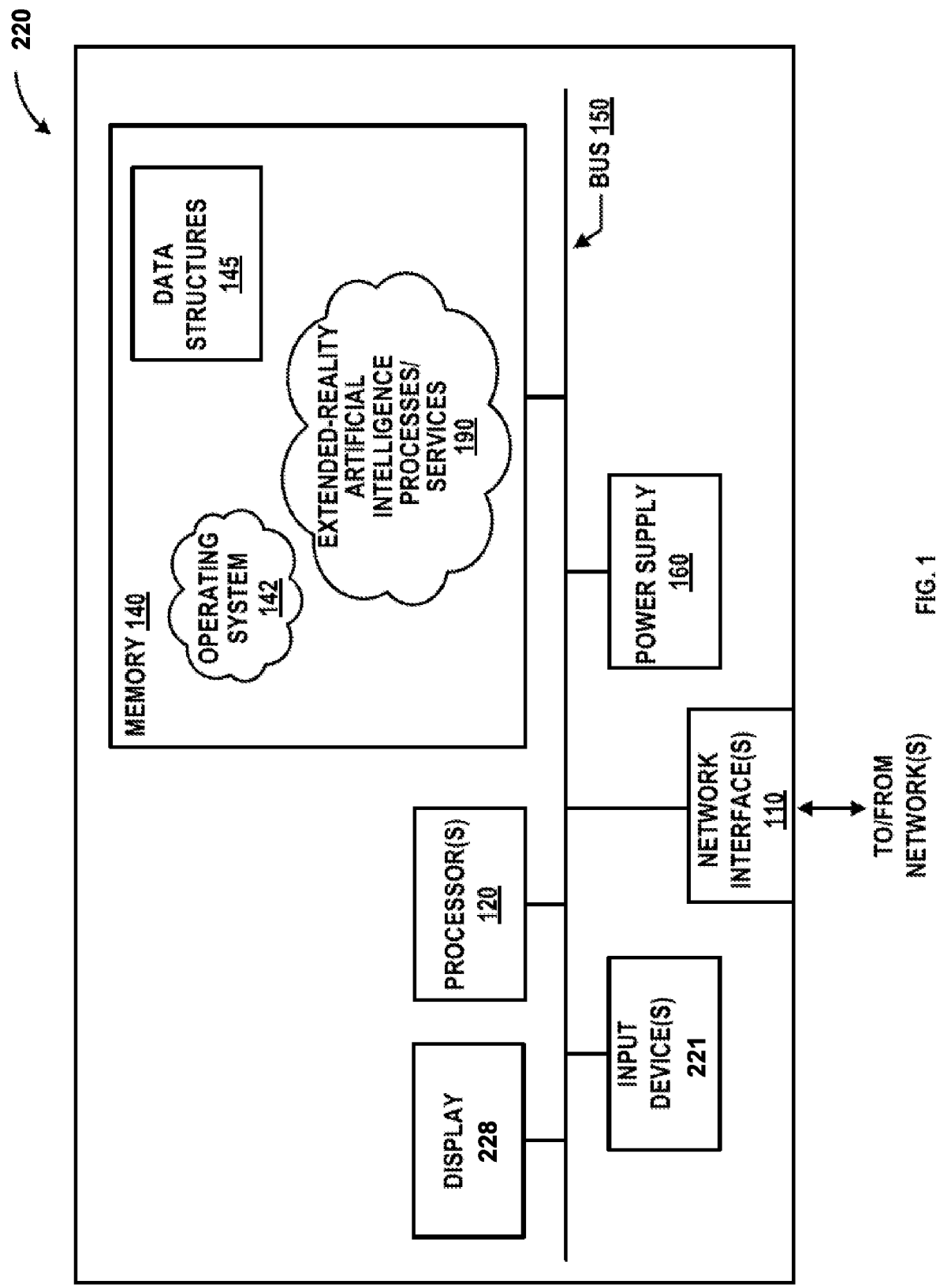
FIG. 1 is a schematic block diagram of XR device in an embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR or extended reality (XR) platforms with other VR SDKs and software development tools known to VR developers.

Computer-Implemented System

FIG. 1 is a schematic block diagram of an example XR device 220, such as wearable XR headset, that may be used with one or more embodiments described herein.

XR device 220 comprises one or more network interfaces 110 (e.g., wired, wireless, PLC, etc.), at least one processor 120, and a memory 140 interconnected by a system bus 150, as well as a power supply 160 (e.g., battery, plug-in adapter, solar power, etc.). XR device 220 can further include a display 228 for display of the XR learning environment, where display 228 can include a virtual reality display of a VR headset. Further, XR device 220 can include input device(s) 221, which can include audio input devices and orientation/inertial measurement devices. For tracking of body parts, such as hands, faces, arms and legs, held physical objects, and the like, input devices include cameras (such as integrated with an XR headset device or external cameras) and/or wearable movement tracking electronic devices, such as electronic gloves, electronic straps and bands, and other electronic wearables. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device 220 and need not be self-contained on the XR device 220.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, XR device 220 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and the methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes XR device 220 by, inter alia, invoking operations in support of software processes and/or services executing on the device. These software processes and/or services may include Extended Reality (XR) artificial intelligence processes/services 190, which can include methods and/or implementations of standalone processes and/or modules providing functionality described herein. While XR artificial intelligence (AI) processes/services 190 are illustrated in centralized memory 140, alternative embodiments provide for the processes/services to be operated as programmed software within the network interfaces 110, such as a component of a MAC layer, and/or as part of a distributed computing network environment.

In various embodiments AI processes/services 190 may create requested digital object images via image generating AI system, such as Dall-E or Dall-E 2 (see https://openai.com/product/dall-e-2 incorporated herein by preference) or other similar image generation systems and other synthetic media. In other embodiments, an AI process/service 190 might retrieve a requested digital object image from one or more local databases, centralized databases, cloud-based databases such as Internet databases, or decentralized databases.

Figure 2:
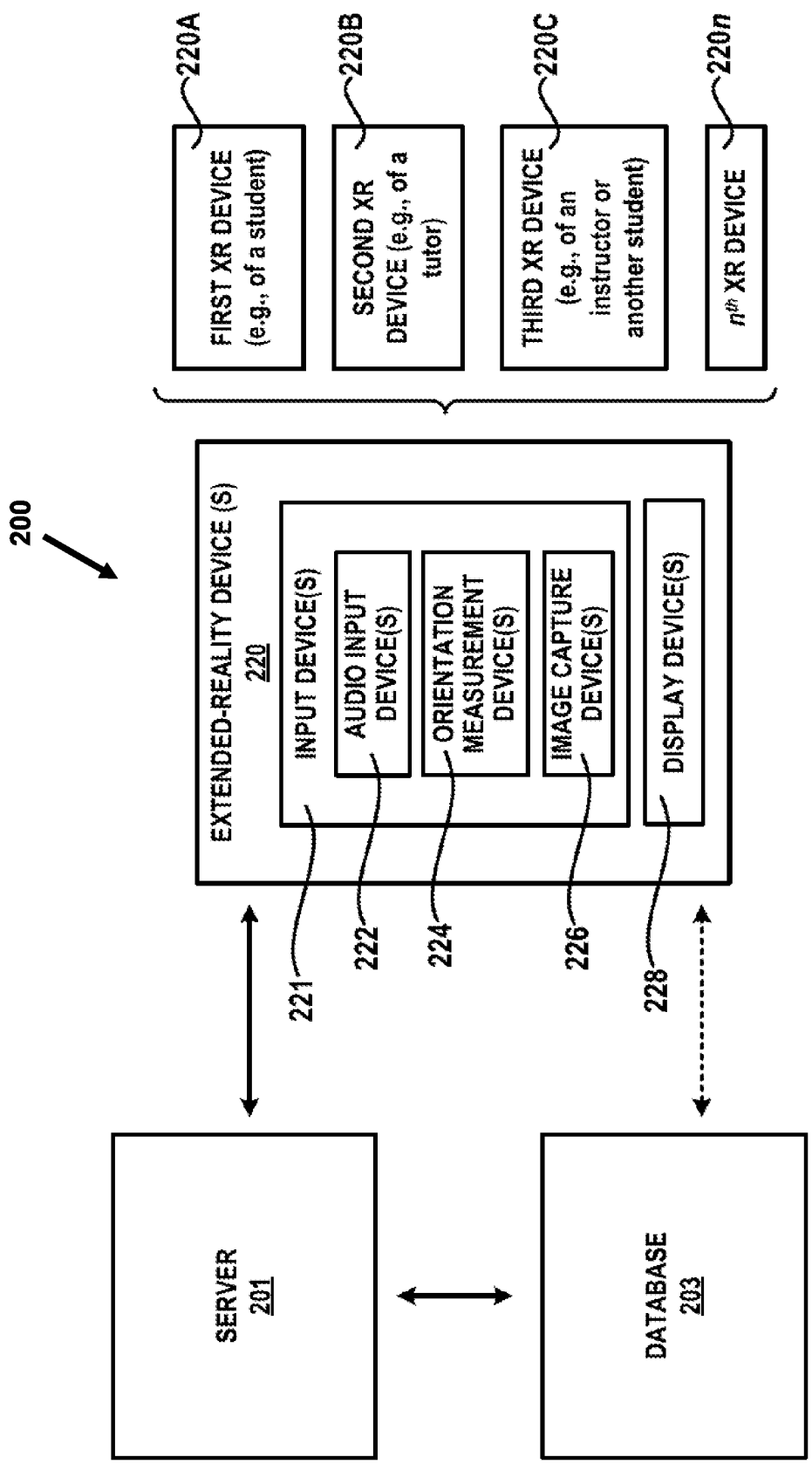
FIG. 2 is a block diagram of an XR system platform in an embodiment of the invention.

Referring to FIG. 2, an XR system (hereinafter, "system 200") for implementation of the XR learning environment, including an XR server 201 accessible by a plurality of XR devices 220 (e.g., a first XR device 220A of a first user such as a student, a second XR device 220B of a second user such as a tutor, a third XR device 220C of a third user such as an instructor . . . an nth XR device 220n belonging to another user, etc.) and another suitable computing devices with which a user can participate in the XR learning environment. The system includes a database 203 communicatively coupled to the XR server 201.

XR devices 220 includes components as input devices 221, such as audio input devices 222, orientation measurement devices 224, image capture devices 226 and XR display devices 228, such as headset display devices.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

Figure 3:
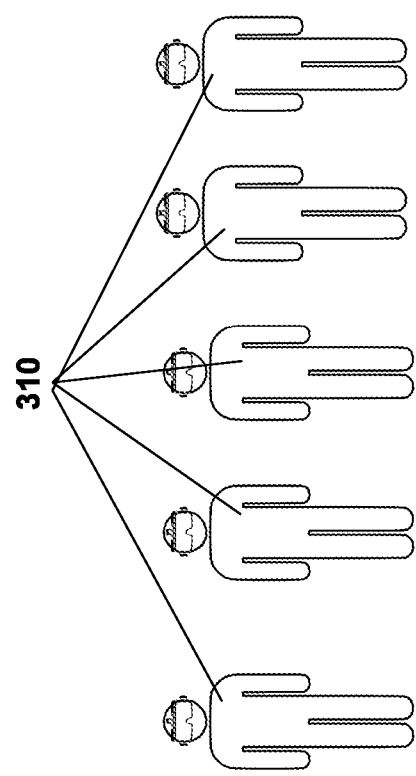
FIG. 3 is a schematic diagram illustrating an instructor with "n" number of students in a virtual room of an XR environment in an embodiment of the invention.
Figure 3:
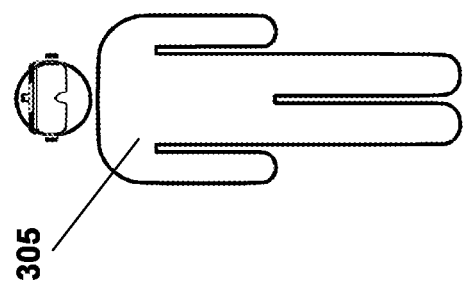

Referring to FIG. 3, an instructor 305, such as a teacher, tutor and the like, is in a virtual reality (VR) room with n number of students 310, such as students studying in the same class or course, tutees, and the like. It will be appreciated that instructor 305 and students 310 enter the same VR room in an XR environment through respective XR devices, such as XR headsets that each user is wearing.

Figure 4:
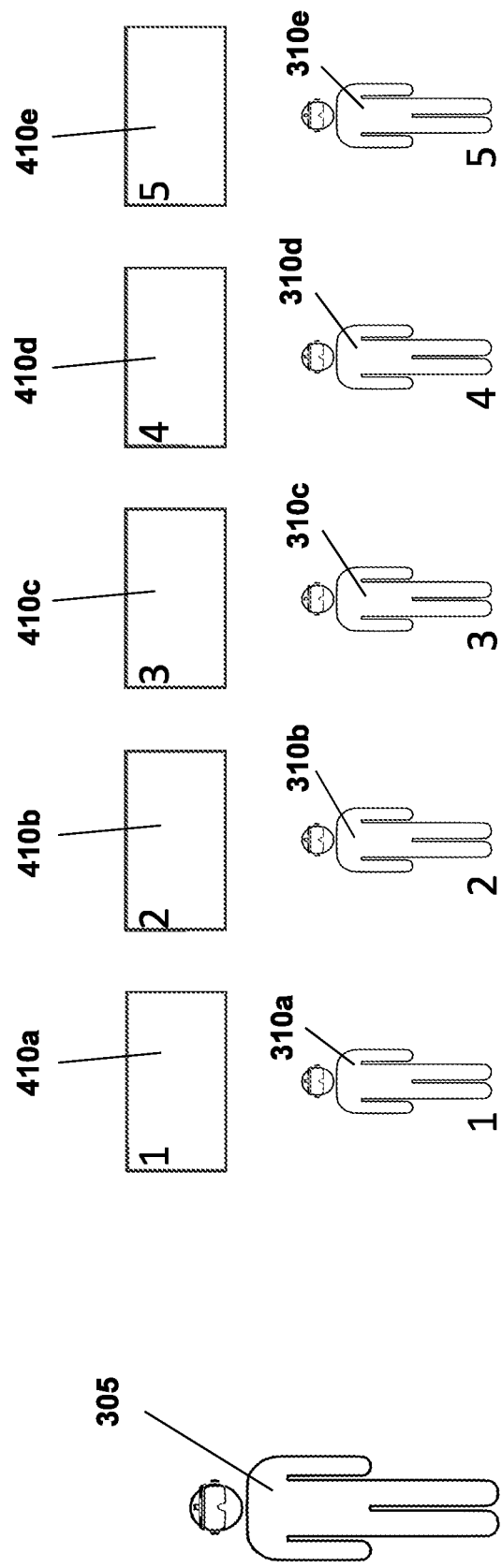
FIG. 4 is schematic diagram illustrating an instructor with "n" number of students in a virtual room each standing in front of a virtual information board segment in an embodiment of the invention.
Figure 9:
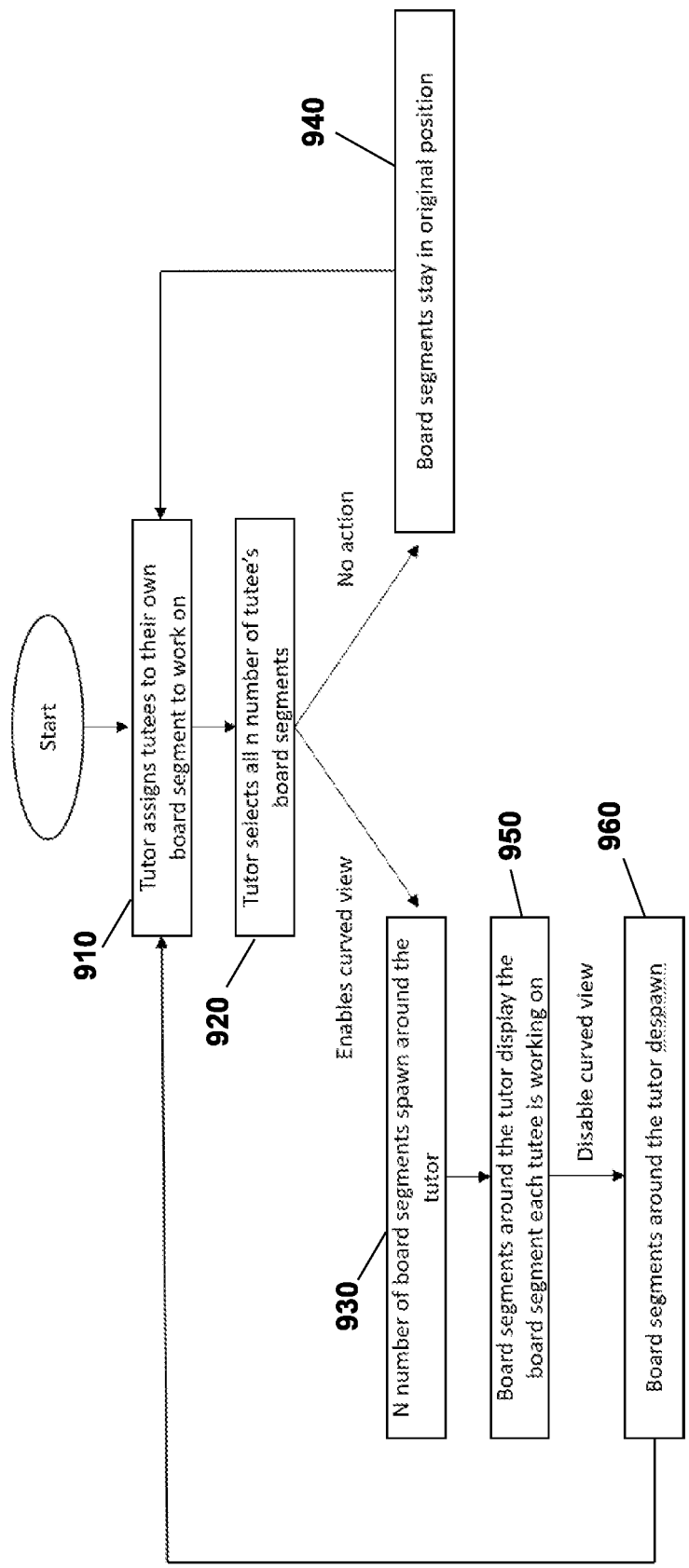
FIG. 9 is a flow diagram illustrating a method of an instructor activating a board segment surround view mode in a XR environment in an embodiment of the invention.

Referring to FIG. 4 and to FIG. 9, step 910, instructor 305 in the VR room with n number of students 310, such as illustrated were n=5, and the instructor 305 tells the students (310a-310e) to each virtually stand in front of a respective board segment (410a-410e) in the VR room. Each board segment preferably has a quadrangle shape, including rectangular and square.

Figure 5:
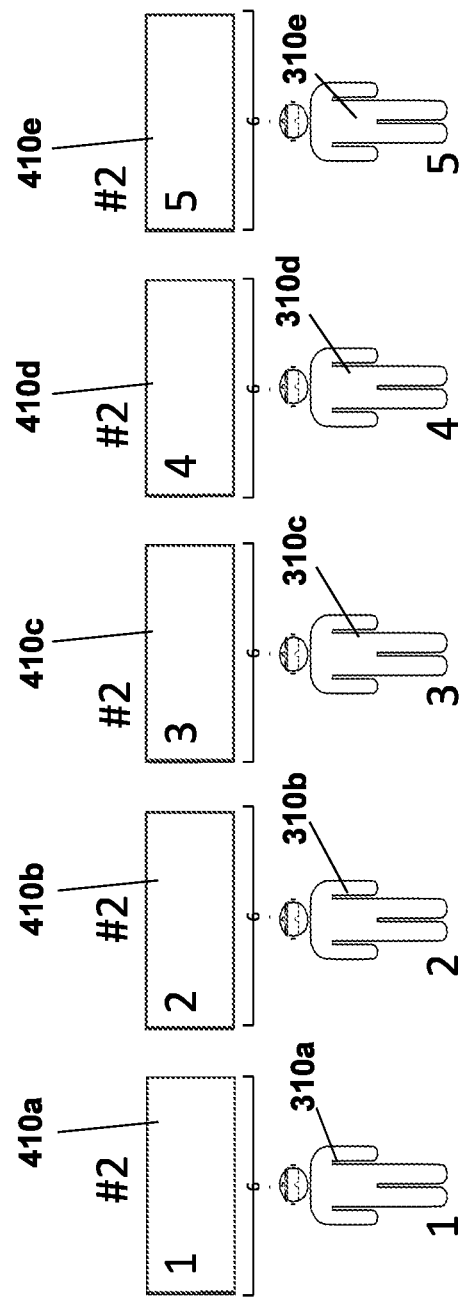
FIG. 5 is schematic diagram illustrating an instructor with "n" number of students in a virtual room each standing in front of a virtual information board segment wherein the instructor has labeled each board segment as #2 in an embodiment of the invention.
Figure 5:
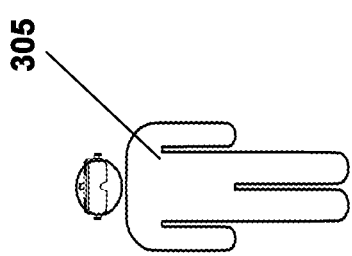

Referring to FIG. 5 and FIG. 9, step 920, after instructor 305 tells the n number of students (310a-310e) to stand in front of his or her corresponding board segment (410a-410e), the instructor 305 can select and label all of the student boards (410a-410e), such as labeling all board segments '#2' as illustrated. Each of the board segments are preferably 6 feet in length in the VR room in the XR environment, so that if they are arranged end to end, the 5 board segments would be 30 feet long and appear to have such extended length to the instructor 305 in the VR room. If the instructor 305 were to attempt to view all of the students' boards, there would be significant difficulty and inconvenience because the extended length would cover too much space and could not be readily seen by the instructor 305 without navigating along all of the boards for viewing. In some embodiments the virtual length (horizontally as viewed by a user in VR) of an information board is preferably from about 3 to about 10 feet, more preferably from about 4 to about 8 feet, and more preferably from about 5 to about 7 feet, and in preferred embodiments about 6 feet.

Figure 6:
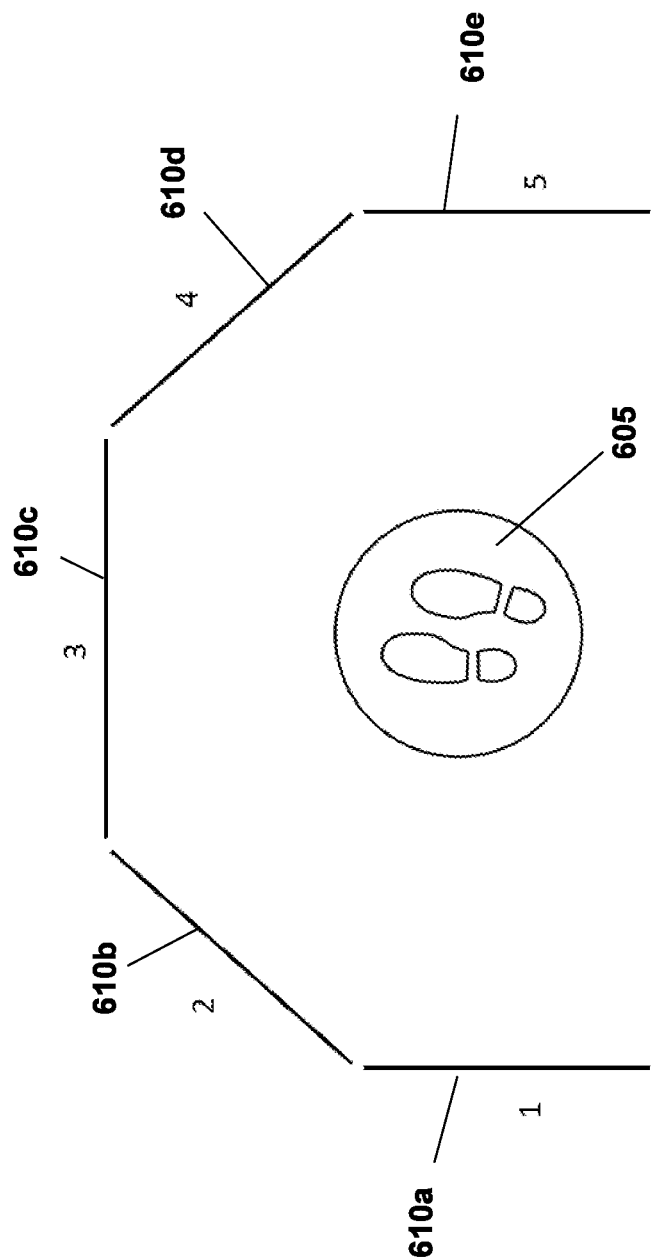
FIG. 6 is schematic diagram illustrating each board segment shown in FIGS. 4 and 5 in board segment surround view mode such that the board segments surround the instructor to permit the instructor to rotate around to easily view each student's board segment in a XR environment in an embodiment of the invention.

Referring to FIG. 6, and FIG. 9, step 930, the instructor 305 can activate board surround view, such that with a control input, such as pressing a virtual button, using a virtual tablet, a voice command, using a virtual interface, signaling a command hand gesture and the like. The activation of the board surround view, changes the virtual position and view of each corresponding board segment (410a-410e) so that the flat virtual boards become arranged so as to surround the instructor, such as an apparent curve arrangement, and with reference to FIG. 9 at step 950, the instructor 305 can easily rotate his or her head or move his or her feet, and observe what the students 310 are doing on their respective board segment (610a-610e) in real time. The instructor 305 can remain in their original position, and provide assistance and feedback on the respective board segments (610a-610e), as they are being displayed around the instructor in a close proximity surrounding or curved arrangement. It will be appreciated that other objects in the virtual room are not required to be moved, and that the students 310 need not move. In embodiments, while the instructor's view changes during board surround view on the instructor's XR display on the XR device, each student's 305 view does not necessarily change and they can continue working on their respective board segment (410a-410e) (see FIG. 5) in real time while the instructor 305 is also viewing and working on the respective board segment in the surrounding board arrangement that is appearing to the instructor 305. In some embodiments, both the instructor 305 and a student 310 could simultaneously make changes to a respective board segment.

Referring to FIG. 9, when the instructor 305 has finished his or her activities in board surround view mode, the instructor can provide a control input or command and the like to deactivate the surround view mode at step 960 and the boards (610a-610e of FIG. 6) will despawn, such as retuning from the instructor's perspective back to the and board arrangement of view of FIG. 5, or alternatively disappear to otherwise be changed in appearance. If an instructor 305 does not activate surround view, it will be appreciated that board segments (410a-410e) remain in their original position at step 940.

Figure 7:
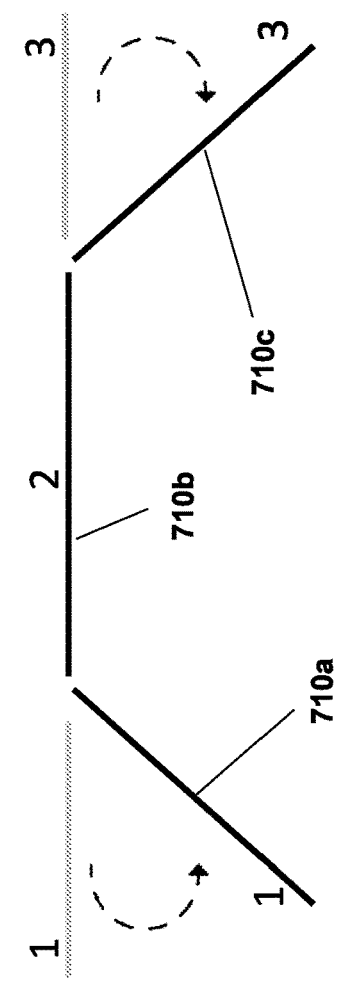
FIG. 7 is schematic diagram illustrating selected board segments (1-3) surrounding a user that activates board surround view mode in a XR environment in an embodiment of the invention.
Figure 7:
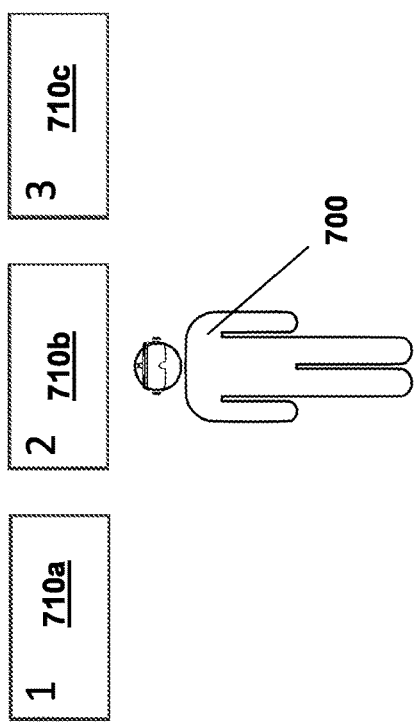
Figure 10:
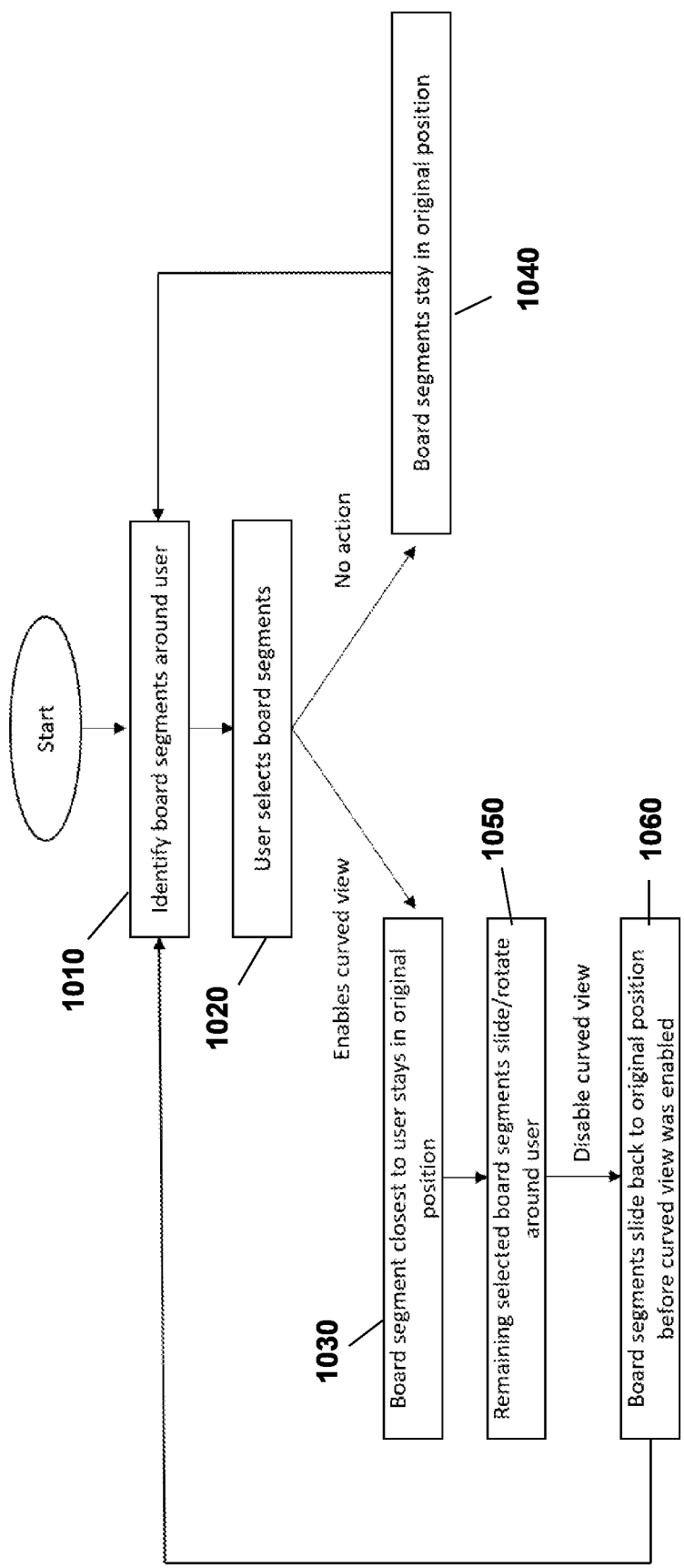
FIG. 10 is a flow diagram illustrating a method of a user activating a board segment surround view mode in a XR environment in an embodiment of the invention.

Referring to FIGS. 7 and 10, in other embodiments, any user 700 working with or viewing information board segments in an XR environment, not only instructors and students, can activate a board surround view mode to surround himself or herself with selected boards. At step 1010, user 700 identifies board segment near himself or herself in the XR environment. User 700, for example, is virtually standing in front of multiple board segments (710a-710c) and, at step 1020, can select the board segment (710b) they are directly in front as a forward segment (at step 1030) of a surround mode with adjacent segments, and then activate board surround view mode, and the adjacent board segments (710a and 710b) on either side of the selected forward board segment (710b) can be rotated, slid, shifted or otherwise altered in appearance at step 1050 in the virtual environment around the user 700, so that the user 700 can view and work more easily on any of the boards (710a-710c) by rotating the user's head or body to view any desired board in the "curved" or surrounding board arrangement. The board segments are numbered 1 (710a), 2 (710b), and 3 (710c), and correspond to 1, 2, and 3 in surround view shown in FIG. 7. If a user 700 does not activate surround view, it will be appreciated that board segments (710a-710c) remain in their original position at step 1040 (FIG. 10).

Figure 8:
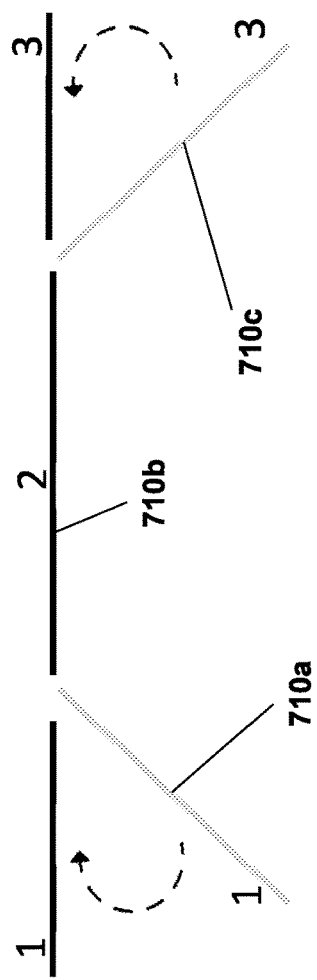
FIG. 8 is schematic diagram illustrating the board segments (1-3) shown in FIG. 7 returning to their linear alignment position when surrounding board segment view is turned off in a XR environment in an embodiment of the invention.
Figure 8:
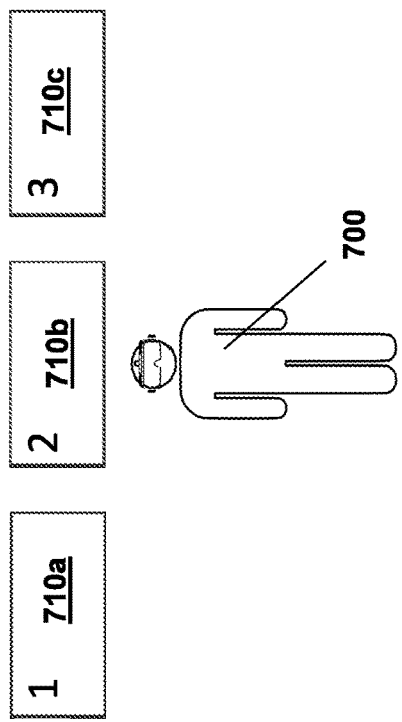

Referring to FIG. 8 and step 1060 of FIG. 10, the user 700 at any time after turning on board surround view mode, can turn the view off, and the board segments will return to their original 'normal' position (FIG. 7 showing boards linearly arranged before shifting to surround position).

It should be understood from the foregoing that, while embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for changing display of information boards in an extended reality environment comprising:
   displaying on a display of an extended reality device of an instructor user an extended reality environment including a plurality of information boards in a linear arrangement next to one another wherein each of a plurality of different student users is simultaneously providing visual information to a student user's respective information board of the plurality of information boards in real time;
   detecting an activation control input from the instructor user requesting that the plurality of information boards be changed to a surround view adjacent the instructor user's position in the extended reality environment; and
   changing appearance of the plurality of information boards from the linear arrangement to said plurality of information boards appearing to surround or partially surround the instructor user that enables the instructor user to simultaneously view each student user's visual information provided to each student user's corresponding information board in real time while each student user continues to simultaneously see their respective information board separate and apart from the plurality of information boards being viewed by the instructor user in the extended reality environment.

2. The method of claim 1, wherein interaction of the instructor user is received to a surrounding or partially surrounding information board of the plurality of information boards and the results of said interaction are simultaneously displayed to the instructor user and to the corresponding student user that is using the information board from which interaction of the instructor user was received.

3. The method of claim 1, wherein interaction of the instructor user is received to a surrounding or partially surrounding information board of the plurality of information boards and the results of said interaction are simultaneously displayed to another student user viewing another information board different from the information board that the instructor user interacted with.

4. The method of claim 3, wherein the results of said interaction of the instructor user are simultaneously displayed to the another student user viewing the another information board having a quadrangle shape.

5. The method of claim 4, further comprising one of rotating, sliding, shifting or folding at least 2 information boards of the plurality of information boards towards the instructor user to appear to surround or partially surround the instructor user.

6. The method of claim 3, further comprising one of rotating, sliding, shifting or folding at least 2 information boards of the plurality of information boards towards the instructor user to appear to surround or partially surround the instructor user.

7. The method of claim 1, further comprising receiving a deactivation control input from the instructor user and returning the plurality of information boards from appearing to surround or partially surround the instructor user to the linear arrangement.

8. The method of claim 7, wherein each of the plurality of information boards has a virtual length of from about 3 feet to about 10 feet.

9. The method of claim 8, wherein each of the plurality of information boards has a virtual length of about 6 feet.

10. The method of claim 1, wherein each of the plurality of information boards has a virtual length of from about 3 feet to about 10 feet.

11. The method of claim 10, wherein each of the plurality of information boards has a virtual length of about 6 feet.

12. The method of claim 1, further comprising one of rotating, sliding, shifting or folding at least 2 information boards of the plurality of information boards towards the instructor user to appear to surround or partially surround the instructor user.

13. The method of claim 12, wherein each of the plurality of information boards has a quadrangle shape.

14. The method of claim 13, wherein one information board of the plurality of information boards remains in a stationary position relative to the instructor user while other information boards move to appear to surround or partially surround the instructor user.

15. The method of claim 1, wherein one information board of the plurality of information boards remains in a stationary position relative to the instructor user while other information boards move to appear to surround or partially surround the instructor user.

16. The method of claim 15, further comprising one of rotating, sliding, shifting or folding at least 2 information boards of the plurality of information boards towards the instructor user to appear to surround or partially surround the instructor user.

17. The method of claim 16, wherein each of the plurality of information boards has a virtual length of from about 3 feet to about 10 feet.

18. The method of claim 17, wherein each of the plurality of information boards has a virtual length of about 6 feet.

19. The method of claim 1, wherein each of the plurality of information boards has a quadrangle shape.

* * * * *